March 9, 1926. 1,576,345
C. MARTINEZ
COTTON CLEANING CYLINDER
Filed May 23, 1925 2 Sheets-Sheet 1
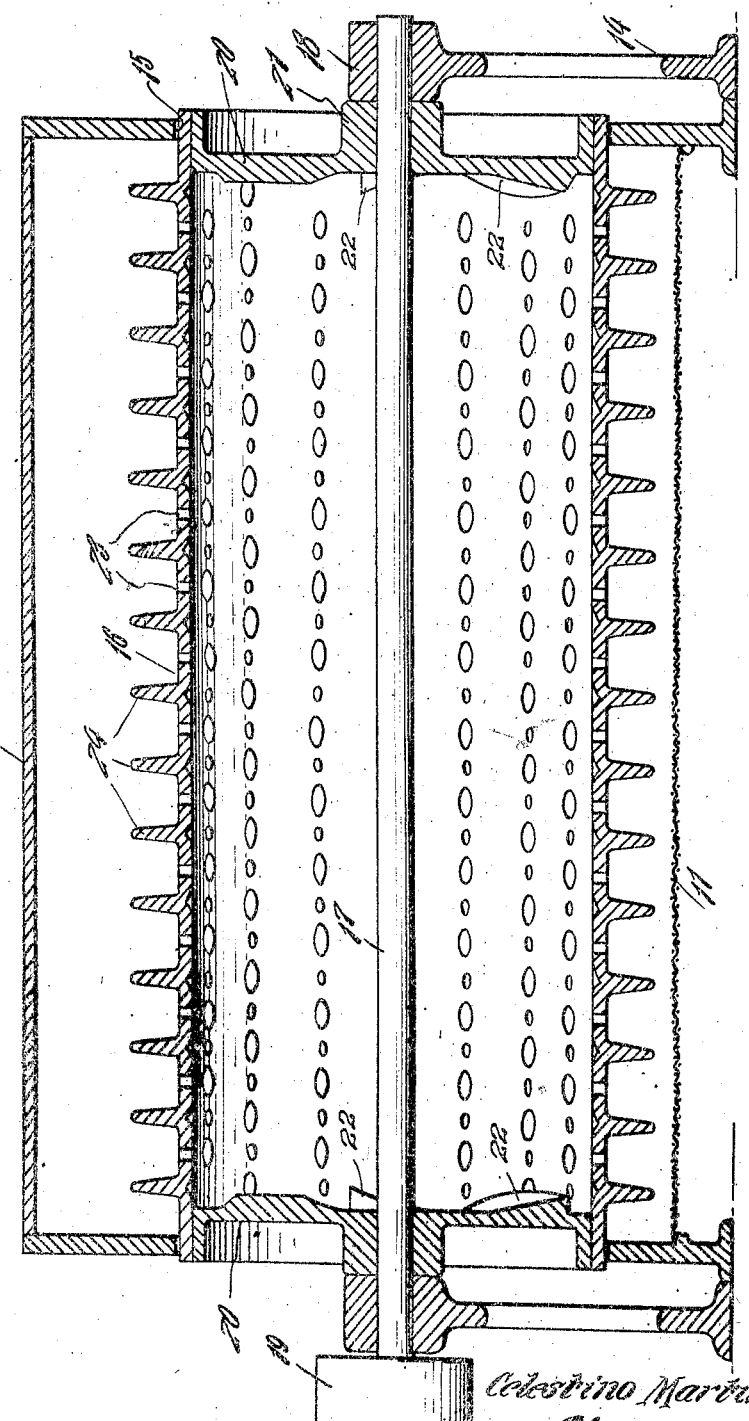

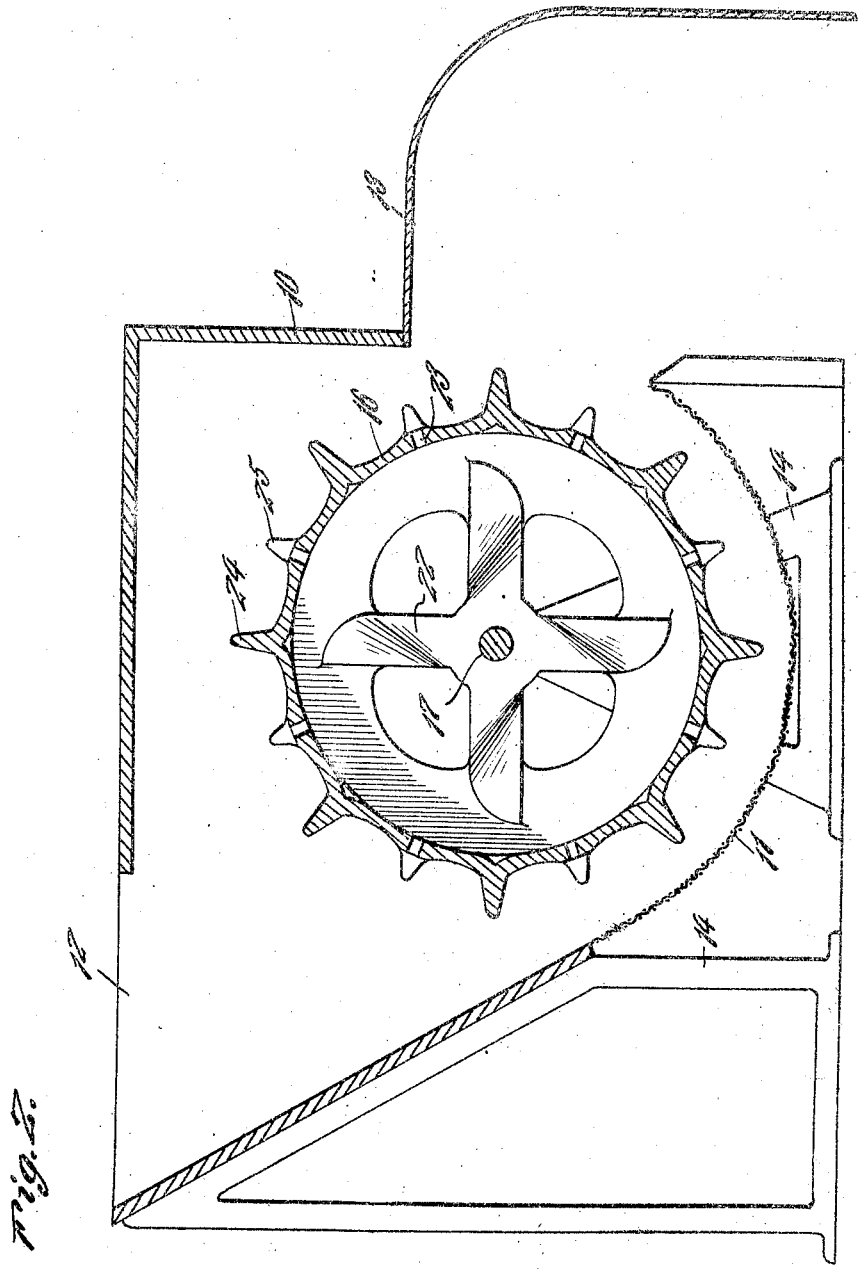

Patented Mar. 9, 1926.

1,576,345

UNITED STATES PATENT OFFICE.

CELESTINO MARTINEZ, OF SAN DIEGO, TEXAS.

COTTON-CLEANING CYLINDER.

Application filed May 23, 1925. Serial No. 32,419.

*To all whom it may concern:*

Be it known that I, CELESTINO MARTINEZ, a citizen of the United States, residing at San Diego, in the county of Duval and State of Texas, have invented new and useful Improvements in Cotton-Cleaning Cylinders, of which the following is a specification.

This invention comprehends the provision of a cotton cleaning machine, including a cylinder having spaced parallel rows of fingers designed and related to engage and move the cotton across the foraminated bottom of the machine without any tendency to tear, twist or roll the same, and also subject the cotton to air currents with a view of cleaning the same.

The nature and advantages of the invention will be better understood when the following detailed description is read in connection with the accompanying drawings, the invention residing in the construction, combination and arrangement of parts as claimed.

In the drawing forming part of this application like numerals of reference indicate similar parts in the several views.

Figure 1 is longitudinal sectional view through the machine.

Figure 2 is a transverse sectional view.

The machine forming the subject matter of the present invention includes a box-like casing indicated generally at 10, and which casing includes a curved foraminated bottom 11, through which the foreign matter separated from the cotton is allowed to pass. The cotton is fed into the casing through an opening 12 in the top thereof, and after being moved across the bottom 11 in a manner to be hereinafter described, it passes from the casing 10 through an outlet shoot 13. The casing 10 is mounted upon suitable supporting legs 14.

The opposed end walls of the casing 10 are provided with openings 15 which receive the cylinder 16, the latter being arranged longitudinally within the casing 10 and mounted upon the shaft 17. This shaft is journalled in suitable bearings 18, and is provided at one end with a pulley 19 over which is adapted to be trained a power belt not shown. The cylinder may be made in one piece or in a number of sections suitably connected together, the opposite end of the cylinder being inclosed by heads 20 which are provided with hubs 21 to receive the shaft 17. It might here be stated that any number of cylinders may be employed, depending of course upon the desired capacity of the machine. In other words, it will be noted, that there are a number of these cylinders arranged side by side in the ordinary or customary manner. Each head supports a plurality of fan blades 22 which rotate with the cylinder to force air through the perforations 23, these perforations being arranged in parallel rows between the various rows of fingers projecting from the cylinder as clearly illustrated in the drawing. It will be noted upon inspection of Figure 1 that the various rows of fingers are equi-distantly spaced apart, both longitudinally and transversely of the cylinder, one row of fingers indicated at 24 being slightly longer than the adjacent row of fingers indicated at 25. While these fingers are substantially cone-shaped they do not terminate in pointed extremities which would obviously tear or otherwise injure the cotton. The various rows of long and short fingers are alternately arranged about the cylinder as clearly shown in Figure 2, it being understood that the short fingers 25 assist the longer fingers 24 in properly engaging the cotton to move it loosely across the foraminated bottom 11 without any tendency of rolling, twisting, tearing or otherwise injuring the cotton. It might here be stated that the cylinder 16 is adapted to be rotated at a much slower speed than the average cylinder now in use, as the best results are obtained with a reduced speed, which also increases the capacity of the machine. By reason of the construction and arrangement of the various rows of fingers, coupled with the distance at which the cylinder is spaced from the foraminated bottom and the slow speed with which the cylinder is rotated the cotton may be transferred to the belt distributor with the locks as intact as possible, which results in the slight increase in the capacity of the gin, as well as producing a better sample. During the rotation of the cylinder air currents are forced from the inside thereof through the perforations 23, and through the cotton passing across the foraminated bottom with a view of cleaning the cotton, while these air currents also maintain the cylinder free of cotton which passes over the screen.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim is:

A machine of the character described comprising a casing having an inlet opening in the top thereof, a curved foraminated bottom, an outlet chute leading from the casing adjacent the bottom, a cylinder mounted for rotation within the casing and spaced from the bottom, spaced longtiudinal rows of fingers projecting from the cylinder, the fingers of each row being alternately of relatively different lengths, said cylinder having perforations between the fingers of each row, and being concaved between the adjacent rows of said fingers, and fan blades carried by the opposed ends of the cylinder for the purpose specified.

In testimony whereof I affix my signature.

CELESTINO MARTINEZ.